United States Patent
Ariki et al.

(10) Patent No.: US 9,739,797 B2
(45) Date of Patent: Aug. 22, 2017

(54) SENSOR DEVICE

(71) Applicant: DENSO CORPORATION, Kariya, Aichi-pref. (JP)

(72) Inventors: Fumiyoshi Ariki, Komaki (JP); Minekazu Sakai, Kariya (JP); Kiyomasa Sugimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 275 days.

(21) Appl. No.: 14/391,479

(22) PCT Filed: May 13, 2013

(86) PCT No.: PCT/JP2013/003031
§ 371 (c)(1),
(2) Date: Oct. 9, 2014

(87) PCT Pub. No.: WO2013/172010
PCT Pub. Date: Nov. 21, 2013

(65) Prior Publication Data
US 2015/0075285 A1    Mar. 19, 2015

(30) Foreign Application Priority Data

May 15, 2012    (JP) .................................. 2012-111826
Feb. 14, 2013    (JP) .................................. 2013-026974

(51) Int. Cl.
*G01P 15/18*    (2013.01)
*G01P 15/02*    (2013.01)
(Continued)

(52) U.S. Cl.
CPC ........ *G01P 15/125* (2013.01); *G01C 19/5733* (2013.01); *G01C 19/5769* (2013.01); *G01P 15/18* (2013.01)

(58) Field of Classification Search
CPC ............................... G01P 15/125; G01P 15/18
See application file for complete search history.

(56) References Cited

U.S. PATENT DOCUMENTS 6,134,961 A * 10/2000 Touge ................ G01C 19/5719
73/504.04
6,360,604 B1    3/2002 Laermer et al.
(Continued)

FOREIGN PATENT DOCUMENTS

JP    H10-178181 A    6/1998
JP    2006-105698 A    4/2006
(Continued)

OTHER PUBLICATIONS

International Search Report of the International Searching Authority mailed Jun. 18, 2013 for the corresponding international application No. PCT/JP2013/003031 (and English translation).
(Continued)

*Primary Examiner* — Blake A Tankersley
*Assistant Examiner* — Ruben Parco, Jr.
(74) *Attorney, Agent, or Firm* — Posz Law Group, PLC (57) ABSTRACT

A sensor device includes a semiconductor substrate and multiple sensing portions that are placed on one side of the semiconductor substrate and convert a physical quantity into an electrical signal. The one side is parallel to a reference plane defined by an X-direction and a Y-direction perpendicular to each other. The semiconductor substrate has a center point that is both a geometric center and a center of mass. The semiconductor substrate is axisymmetric with respect to each of a first reference line passing through the center point and parallel to the X-direction and a second reference line passing through the center point and parallel to the Y-direction. Each of the sensing portions is axisymmetric with respect to each of the first reference line and the second reference line.

11 Claims, 10 Drawing Sheets

(51) Int. Cl.
    *G01P 15/125*     (2006.01)
    *G01C 19/5733*     (2012.01)
    *G01C 19/5769*     (2012.01)

(56)             References Cited

U.S. PATENT DOCUMENTS

| | | |
|---|---|---|
| 2002/0026830 A1 | 3/2002 | Otani |
| 2007/0024156 A1 | 2/2007 | Li et al. |
| 2007/0090536 A1* | 4/2007 | Sakai .................. B81C 1/0023 257/778 |
| 2007/0119252 A1 | 5/2007 | Adams et al. |
| 2008/0066546 A1 | 3/2008 | Katsumata |
| 2009/0139330 A1 | 6/2009 | Pavelescu et al. |
| 2009/0282914 A1 | 11/2009 | Rehle |
| 2011/0296916 A1 | 12/2011 | Ge et al. |

FOREIGN PATENT DOCUMENTS

| | | |
|---|---|---|
| JP | 2007-139505 A | 6/2007 |
| JP | 2010-107325 A | 5/2010 |
| JP | 2010-190636 A | 9/2010 |
| JP | 2010-251396 A | 11/2010 |
| JP | 2012-2752 A | 1/2012 |

OTHER PUBLICATIONS

Written Opinion of the International Searching Authority mailed Jun. 18, 2013 for the corresponding international application No. PCT/JP2013/003031 (and English translation).
Office Action mailed Jul. 7, 2015 in the corresponding JP application No. 2013-026974 (English translation attached).

* cited by examiner

SENSOR DEVICE

CROSS REFERENCE TO RELATED APPLICATIONS

The present disclosure is a U.S. national stage application of PCT/JP2013/003031 filed on May 13, 2013 and is based on Japanese Patent Application No. 2012-111826 filed on May 15, 2012 and Japanese Patent Application No. 2013-026974 filed on Feb. 14, 2013, the contents of which are incorporated herein by reference.

TECHNICAL FIELD

The present disclosure relates to a sensor device comprising a semiconductor substrate and a sensing portion that is formed on one side of the semiconductor substrate and converts a physical quantity into an electrical signal.

BACKGROUND ART

As disclosed in patent literature 1 as an example, a conventionally used capacitive acceleration sensor includes a substrate, a support portion formed on the substrate, a movable electrode supported by the support portion and is floated above the substrate, and a fixed electrode formed on the substrate. The above-described support portion, movable electrode, and fixed electrode (hereafter, collectively referred to as a sensing portion) are formed on one side of the substrate. The one side is parallel to a reference plane defined by an X-direction and a Y-direction.

The capacitive acceleration sensor disclosed in Patent Literature 1 is axisymmetric with respect to both a first direction passing through a center of the sensor and extending along the X-direction and a second direction passing through the center of the sensor and extending along the Y-direction. With this configuration, when a thermal distortion is produced in the substrate due to a temperature change, the thermal distortion is expected to be distributed symmetric with respect to each of the first direction and the second direction. Thus, thermal stress caused by the thermal distortion is suppressed from being anisotropically applied to the sensing portion. Accordingly, degradation in detection accuracy of the acceleration, which is caused by above-described thermal stress, is suppressed.

However, in the capacitive acceleration sensor, when multiple sensing portions are formed on one substrate, each of the sensing portions is not axisymmetric with respect to both the first direction and the second direction. For example, the capacitive acceleration sensor may be configured so that a sensing portion axisymmetric with respect to the first direction and asymmetric with respect to the second direction and a sensing portion asymmetric with respect to the first direction and axisymmetric with respect to the second direction are formed on one substrate. In this case, when the thermal distortion is produced in the substrate due to the temperature change, the distortion is asymmetric with respect to each of the first direction and the second direction. As a result, thermal stress caused by the distortion is anisotropically applied to each sensing portion and an acceleration detection accuracy of each sensing portion may be degraded. Further, the acceleration detection accuracy of each sensing portion may differ from one another.

PRIOR ART LITERATURES

Patent Literature

Patent Literature 1: JP 2002-82127 A

SUMMARY OF INVENTION

In view of the foregoing difficulties, it is an object of the present disclosure to provide a sensor device in which degradation in a detection accuracy of a physical quantity is suppressed.

According to an aspect of the present disclosure, a sensor device includes a semiconductor substrate and multiple sensing portions that are placed on one side of the semiconductor substrate and convert a physical quantity into an electrical signal. The one side is parallel to a reference plane defined by an X-direction and a Y-direction perpendicular to each other. The semiconductor substrate has a center point that is both a geometric center and a center of mass. The semiconductor substrate is axisymmetric with respect to each of a first reference line passing through the center point and parallel to the X-direction and a second reference line passing through the center point and parallel to the Y-direction. Each of the sensing portions is axisymmetric with respect to each of the first reference line and the second reference line.

With the above sensor device, degradation in the detection accuracy of the physical quantity can be suppressed.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following will describe a sensor device according to an embodiment of the present disclosure with reference to the drawings. The sensor device includes a semiconductor substrate and a sensing portion that is disposed close to one side of the semiconductor substrate, the sensing portion converts a physical quantity into an electrical signal. In the present disclosure, the sensing portion includes an acceleration sensor.

First Embodiment

Figure 1:
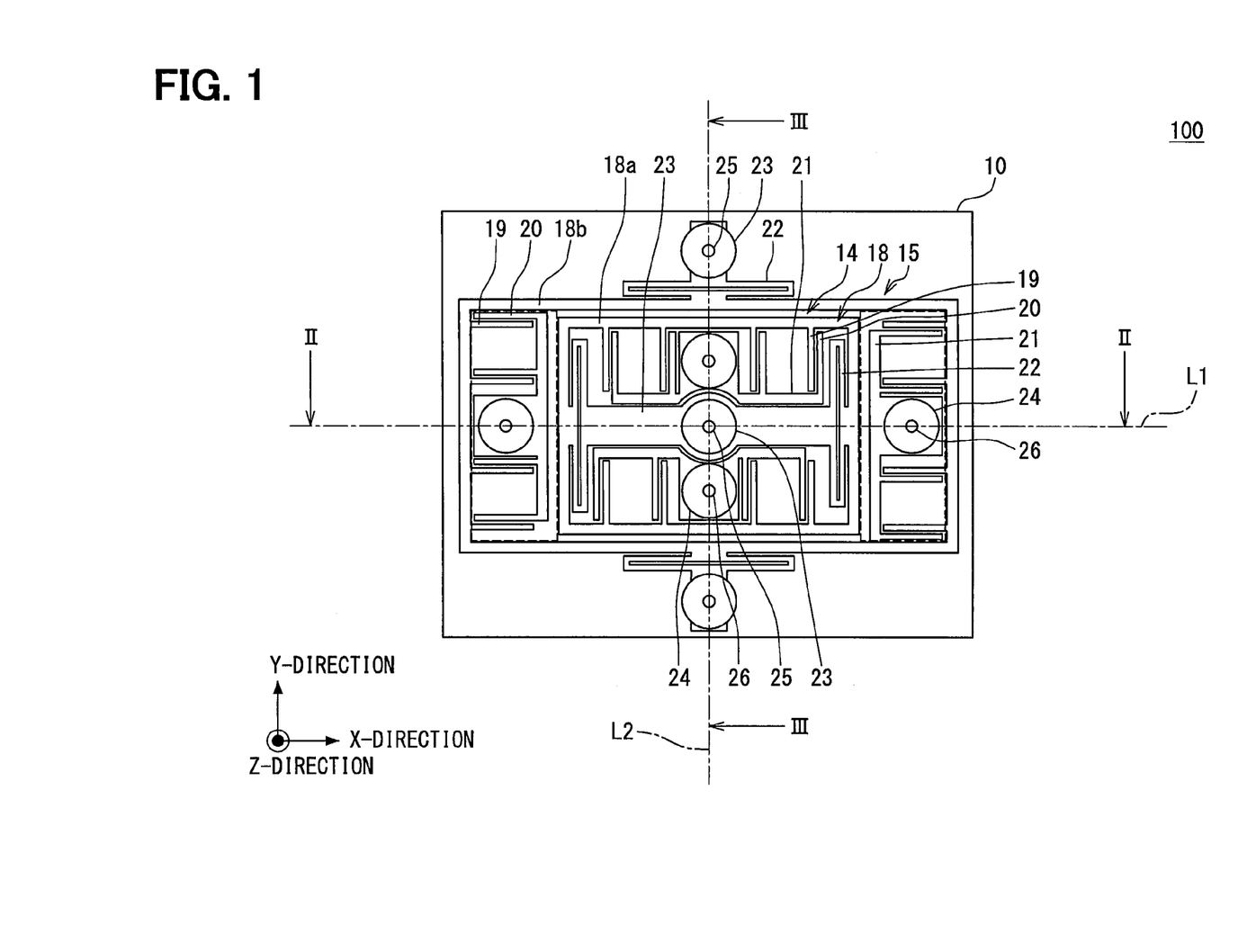
FIG. 1 is a top view schematically illustrating a configuration of a sensor device according to a first embodiment of the present disclosure.
Figure 2:
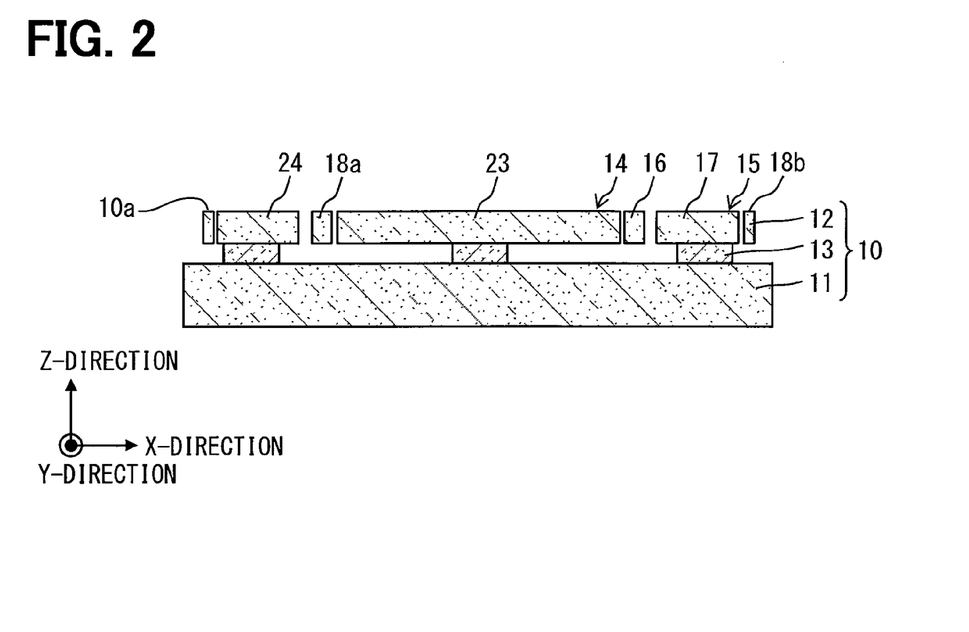
FIG. 2 is a sectional view taken along line II-II of FIG. 1.
Figure 3:
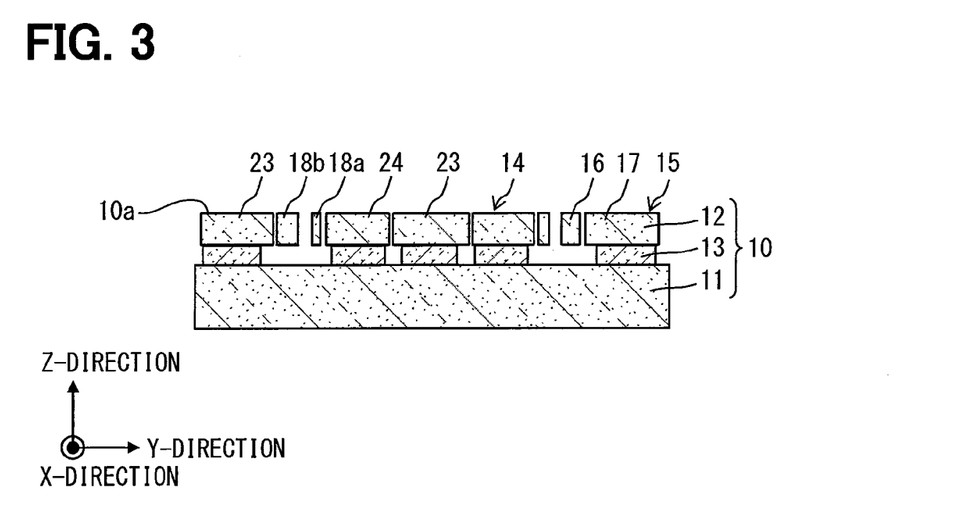
FIG. 3 is a sectional view taken along line of FIG. 1.

The following will describe a sensor device according to a first embodiment with reference to FIG. 1 to FIG. 3. In the following description, two directions perpendicular to each other are referred to as an X-direction and a Y-direction, respectively, and a direction perpendicular to both the X-direction and the Y-direction are referred to as a Z-direction.

As illustrated in FIG. 1, the sensor device 100 is provided by a microstructure, which is formed by a part of a semiconductor substrate 10. As illustrated in FIG. 2 and FIG. 3, the semiconductor substrate 10 is provided by a Silicon On Insulator (SOI) substrate in which an insulating layer 13 is sandwiched between a first semiconductor layer 11 and a second semiconductor layer 12. Sensing portions 14, 15 are provided by a portion of above-described microstructure. The microstructure is formed by a surface portion of the semiconductor substrate 10. The sensing portions 14, 15 are disposed close to one side 10a of the semiconductor substrate 10. That is, in the semiconductor substrate 10, the second semiconductor layer 12, the insulating layer 13, and the first semiconductor layer 11 are arranged in described order in a direction from the one side 10a toward another side, which is opposite to the one side 10a. The sensing portions 14, 15 are provided by the second semiconductor layer 12. The one side 10a is parallel to a reference plane defined by the X-direction and the Y-direction.

The sensing portions 14, 15 are formed by etching. Specifically, the second semiconductor layer 12 and the insulating layer 13 are etched into a predetermined shape by a well-known exposure technology. Each of the sensing portions 14, 15 includes a floating portion 16 and a fixed portion 17. The floating portion 16 is provided by a part of the second semiconductor layer 12, which is floated above the first semiconductor layer 11 without the insulating layer 13 sandwiched therebetween. The fixed portion 17 is provided by a part of the second semiconductor layer 12, which is fixed to the first semiconductor layer 11 via the insulating layer 13. That is, the sensing portions 14, 15 are provided by the second semiconductor layer 12 of the semiconductor substrate 10.

The floating portion 16 includes a weight portion 18 that constitutes a center of mass, a movable electrode 19 provided by a part of the weight portion 18, a fixed electrode 20 positioned opposed to the movable electrode 19, a support portion 21 supporting the fixed electrode 20, and a first beam portion 22 that is springy in a direction in which the movable electrode is opposed to the fixed electrode 20.

The fixed portion 17 includes a first anchor 23 that supports the weight portion 18 and a second anchor 24 that supports the fixed electrode 20 via the support portion 21.

The first anchor 23 includes a first pad 25 for receiving a voltage, and the second anchor 24 includes a second pad 26 for outputting a capacitance change of a capacitor to an external element (not shown). The capacitor is configured by the movable electrode 19 and the fixed electrode 20. When an acceleration is applied to the sensor device 100, the weight portion 18 (movable electrode 19) is displaced corresponding to a magnitude of the applied acceleration, and the displacement is converted into the capacitance of the above-described capacitor. After converted to the capacitance, the capacitance is outputted as a detection signal of the physical quantity (acceleration) to the external element through the second pad 26.

As illustrated in FIG. 1 to FIG. 3, the first sensing portion 14 and the second sensing portion 15 are different from each other in shape. The following will describe a configuration of the first sensing portion 14 firstly, and then a configuration of the second sensing portion 15.

The weight portion 18 of the first sensing portion 14 includes a frame portion 18a. A longitudinal direction of the frame portion 18a is along the X-direction and surrounds the first anchor 23. The anchor 23 and the frame portion 18a are coupled with each other via the first beam portions 22. The first beam portion 22 couples one corresponding end of the anchor 23 with the frame portion 18a, and is springy in the X-direction. With this configuration, the frame portion 18a is able to be displaced in the X-direction.

As illustrated in FIG. 1, an area surrounded by the frame portion 18a is equally divided into two areas by the first anchor 23 and the first beam portion 22. The two equally divided areas are symmetrically arranged with respect to a first reference line L1, which passes through a center point of the semiconductor substrate 10 and is parallel to the X-direction. The center point passed through by the first reference line L1 is both the geometric center and the center of mass of the semiconductor substrate 10. The movable electrode 19, the fixed electrode 20, and the support portion 21 supporting the fixed electrode 20 are placed in each of the two equally divided areas. Each movable electrode 19 has a comb shape, and is formed so that a longitudinal direction of the movable electrode 19 is along the Y-direction. Each movable electrode 19 extends from an inner surface of the frame portion 18a along the X-direction. Each fixed electrode 20 has a comb shape, and is formed so that a longitudinal direction of the fixed electrode 20 is along the Y-direction. Each fixed electrode 20 extends from a surface of the support portion 21, which is positioned opposed to the frame portion 18a. The comb-shaped electrodes 19, 20 are engaged with each other so that they are opposed to each other in the X-direction. The comb-shaped electrodes 19, provide a first capacitor. The capacitance of the first capacitor changes with a displacement amount of the frame portion 18a (movable electrode 19) in the X-direction.

As described above, the area surrounded by the frame portion 18a is equally divided into two areas by the first anchor 23 and the first beam portion 22. The movable electrode 19 positioned in one area (hereafter, referred to as an upper area) positioned in an upper side on the drawing sheet is positioned on a left side of the opposed fixed electrode 20 on the drawing sheet. The movable electrode 19 positioned in the other area (hereafter, referred to as a lower area) positioned in a lower side on the drawing sheet is positioned on a right side of the opposed fixed electrode 20 on the drawing sheet. For this reason, when the frame portion 18a moves rightward on the drawing sheet, the movable electrode 19 and the fixed electrode 20 positioned in the upper area are displaced so that they are apart from each other and the movable electrode 19 and fixed electrode 20 positioned in the lower area are displaced so that they become close to each other. For this reason, when the capacitance of the first capacitor formed by the electrodes 19, 20 in the upper area increases, the capacitance of the first capacitor formed by the electrodes 19, 20 in the lower area decreases, and when the capacitance of the first capacitor formed by the electrodes 19, 20 in the lower area increases, the capacitance of the first capacitor formed by the electrodes 19, 20 in the upper area decreases. In the present embodiment, acceleration in the X-direction is detected based on the capacitance difference between the two first capacitors. In the first sensing portion 14, the first anchor 23 is positioned in the center of the semiconductor substrate 10, and is lined with the second anchor 24 that is spaced from the first anchor 23 in the Y-direction by an extremely small clearance (clearance for partitioning the anchors 23, 24 from each other).

A description will be given to the second sensing portion 15. The weight portion 18 of the second sensing portion 15 has a frame portion 18b surrounding the first sensing portion 14. The first anchor 23 is placed outside the area surrounded by the frame portion 18b. The area in the frame portion 18b along the X-direction and the first anchor 23 are coupled with each other through the first beam portion 22 that is springy in the Y-direction. This configuration enables the frame portion 18b to be displaced in the X-direction.

Two rectangular areas (areas surrounded by broken lines) are formed between a part of the frame portion 18b which is along the Y-direction and the first sensing portion 14. These two areas are symmetrically arranged with respect to the second reference line L2, which is parallel to the Y-direction and passes through the center point of the semiconductor substrate. The center point is both the geometric center and the center of mass of the semiconductor substrate 10. The movable electrode 19, the fixed electrode 20, and the support portion 21 that supports the fixed electrode 20 are placed in each of the two areas. Each of the movable electrodes 19 extends in the X-direction from an inner surface of the part of the frame portion 18b. Each of the movable electrodes 19 has a comb shape, and is formed so that a longitudinal direction of the movable electrode 19 is along the X-direction. Each of the fixed electrodes 20 extends in the X-direction from an inner surface of the support portion 21. The inner surface of the support portion 21 is a surface that is opposed to the frame portion 18b. Each of the fixed electrodes 20 has a comb shape, and is formed so that a longitudinal direction of the fixed electrode is along the X-direction. The comb-shaped electrodes 19, 20 are engaged with each other so that they are opposed to each other in the Y-direction. The comb-shaped electrodes 19, 20 provide a second capacitor. The capacitance of the second capacitor changes with a displacement amount of the frame portion 18b (movable electrode 19) in the Y-direction.

As described above, the two areas are formed between a part of the frame portion 18b which is along the Y-direction and the first sensing portion 14. The movable electrode 19 positioned in one area (hereafter, referred to as a left area) positioned on a left side on the drawing sheet is positioned below the opposed fixed electrode 20 on the drawing sheet. The movable electrode 19 positioned in the other area (hereafter, referred to as a right area) positioned on a right side on the drawing sheet is positioned above the opposed fixed electrode 20 on the drawing sheet. For this reason, when the frame portion 18b moves downward on the drawing sheet, the movable electrode 19 and the fixed electrode 20 positioned in the left area are displaced so that they are apart from each other and the movable electrode 19 and the fixed electrode 20 positioned in the right area are displaced so that they become close to each other. For this reason, when a capacitance of the second capacitor formed by the electrodes 19, 20 increases, a capacitance of the second capacitor formed by the electrodes 19, 20 in the right area decreases, and when the capacitance of the second capacitor formed by the electrodes 19, 20 decreases, the capacitance of the second capacitor formed by the electrodes 19, 20 in the right area increases. In the present embodiment, acceleration in the Y-direction is detected based on the capacitance difference between the two second capacitors.

The following will describe features of the sensor device 100 according to the present embodiment. As illustrated in FIG. 1, the semiconductor substrate 10 is shaped axisymmetric with respect to each of the following first reference line L1 and the second reference line L2. The first reference line L1 is parallel to the X-direction and passes through the center point of the semiconductor substrate. Herein, the center point of the semiconductor substrate is both the geometric center and the center of mass of the semiconductor substrate 10. The second reference line L2 is parallel to the Y-direction and passes through the center point of the semiconductor substrate 10. Each of the sensing portions 14, 15 is also axisymmetric with respect to the first reference line L1 and the second reference line L2. The movable electrodes 19 or the fixed electrodes 20 according to the present embodiment are not strictly symmetric with respect to each of the reference lines L1, L2. However, the mass and a quantity of each of the movable electrodes 19 and the fixed electrodes 20 are symmetric with respect to each of the reference lines L1, L2, and gross mass of the electrodes 19, 20 is much smaller than that of the weight portion 18. For this reason, the electrodes 19, hardly have influence on the thermal distortion produced in the semiconductor substrate 10.

Further, in the present embodiment, the first sensing portion 14 is placed in the area surrounded by the frame portion 18b of the second sensing portion 15. That is the sensing portions 14, 15 are arranged in a nested shape. The first anchor 23 and the second anchor 24 are arranged in the first reference line L1, and are also arranged in the second reference line L2.

A description will be given to the action and effect of the sensor device 100 according to the present embodiment. As described above, the multiple sensing portions 14, 15 are formed in single semiconductor substrate 10, and each of the sensing portions 14, 15 and the semiconductor substrate 10 are shaped axisymmetric with respect to each of the first reference line L1 and the second reference line L2. In a comparison example, a sensing portion axisymmetric with respect to the first reference line L1 and asymmetric with respect to the second reference line L2 and a sensing portion asymmetric with respect to the first reference line L1 and axisymmetric with respect to the second reference line L2 are formed in single semiconductor substrate. In the present embodiment, unlike the comparison example, it is expected that the distortion is symmetric with respect to each of the first reference line L1 and the second reference line L2 even if thermal distortion is produced in the semiconductor substrate 10 due to temperature change. Therefore, thermal stress caused by that distortion is suppressed from being anisotropically applied to each sensing portion 14, 15 and degradation in the accuracy of physical quantity detection of each sensing portion 14, 15 is suppressed. Further, a variation in physical quantity detection accuracies of the sensing portions 14, 15 is suppressed.

The sensing portions 14, 15 are arranged in a nested shape. With this configuration, a physical size of the sensor device 100 can be reduced compared with a configuration in which the sensing portions are simply formed in line in the semiconductor substrate. Since the sensing portions 14, are different from one another in physical size, the components of the sensing portions 14, 15 are also different from one another in size. Thus, the sensing portions 14, 15 can have different detection ranges.

The anchors 23, 24 are arranged in line along the first reference line L1 and the second reference line L2. Thus, a configuration of each sensing portion 14, 15 is simplified compared with a configuration in which multiple anchors are not positioned in line along each of the first reference line L1 and the second reference line L2.

As described above, even if thermal distortion is produced in the semiconductor substrate 10 due to temperature change, it is expected that that distortion is distributed symmetric with respect to each of the first reference line L1 and the second reference line L2. In the present embodiment, meanwhile, the two first capacitors placed symmetrically with respect to the first reference line L1 are conversely increased and decreased in capacitance and acceleration in the X-direction is detected based on the capacitance difference between the two first capacitors. In addition, the two second capacitors placed symmetrically with respect to the second reference line L2 are conversely increased and decreased in capacitance and acceleration in the Y-direction is detected based on the capacitance difference between the two second capacitors. With this configuration, errors generated by the thermal stress are canceled out.

In the first sensing portion 14, the first anchor 23 is in line with the second anchor 24 and is spaced from the second anchor 24 by the extremely small clearance in the Y-direction. That is, in the sensing portion having the smallest dimension, the first anchor 23 is in line with the second anchor 24 spaced by the extremely small clearance. The sensing portion having the smallest dimension is also referred to as an inside sensing portion. With this configuration, the amount of distortion produced in the anchors 23, 24 of the semiconductor substrate 10 can be controlled at an equal level compared with a configuration in which the first anchor is arranged apart from the second anchor. Herein, the train in the anchors 23, 24 is produced by the thermal stress that is caused by the thermal distortion. As a result, the amount of distortion of the electrodes 19, 20 suspended by the anchors 23, 24 can also be controlled at an equal level, and fluctuation in an area of the opposed portion and a distance between the two opposed electrodes 19, 20 is suppressed. As a result, degradation in the detection accuracy of the acceleration is suppressed.

Up to this point, a description has been given to a preferred embodiment of the present disclosure. However, the present disclosure is not limited to the above-described embodiment at all and can be variously modified and embodied without departing from the subject matter of the present disclosure.

In the foregoing embodiment, the movable electrodes 19 and the fixed electrodes 20 are not strictly symmetric with respect to each of the reference lines L1, L2. As another example, a configuration in which the movable electrodes 19 and the fixed electrodes 20 are strictly symmetric with respect to each of the reference lines L1, L2 may be adopted.

In the foregoing embodiment, as illustrated in FIG. 1, the second semiconductor layer 12 or the insulating layer 13 is not formed in an area away from the second sensing portion 15. As another example, though not shown in the drawing, a surrounding portion that surrounds each of the sensing portions 14, 15 may be formed in an area away from the second sensing portion 15. Specifically, the surrounding portion may be provided by a configuration in which the second semiconductor layer 12 is coupled to the first semiconductor layer 11 by the insulating layer 13.

In the foregoing embodiment, the first anchor 23 supporting the frame portion 18b is placed outside an area surrounded by the frame portion 18b of the second sensing portion 15. As another example, as illustrated in FIG. 4, the first anchor 23 supporting the frame portion 18b may be placed inside an area surrounded by the frame portion 18b of the second sensing portion 15.

Figure 4:
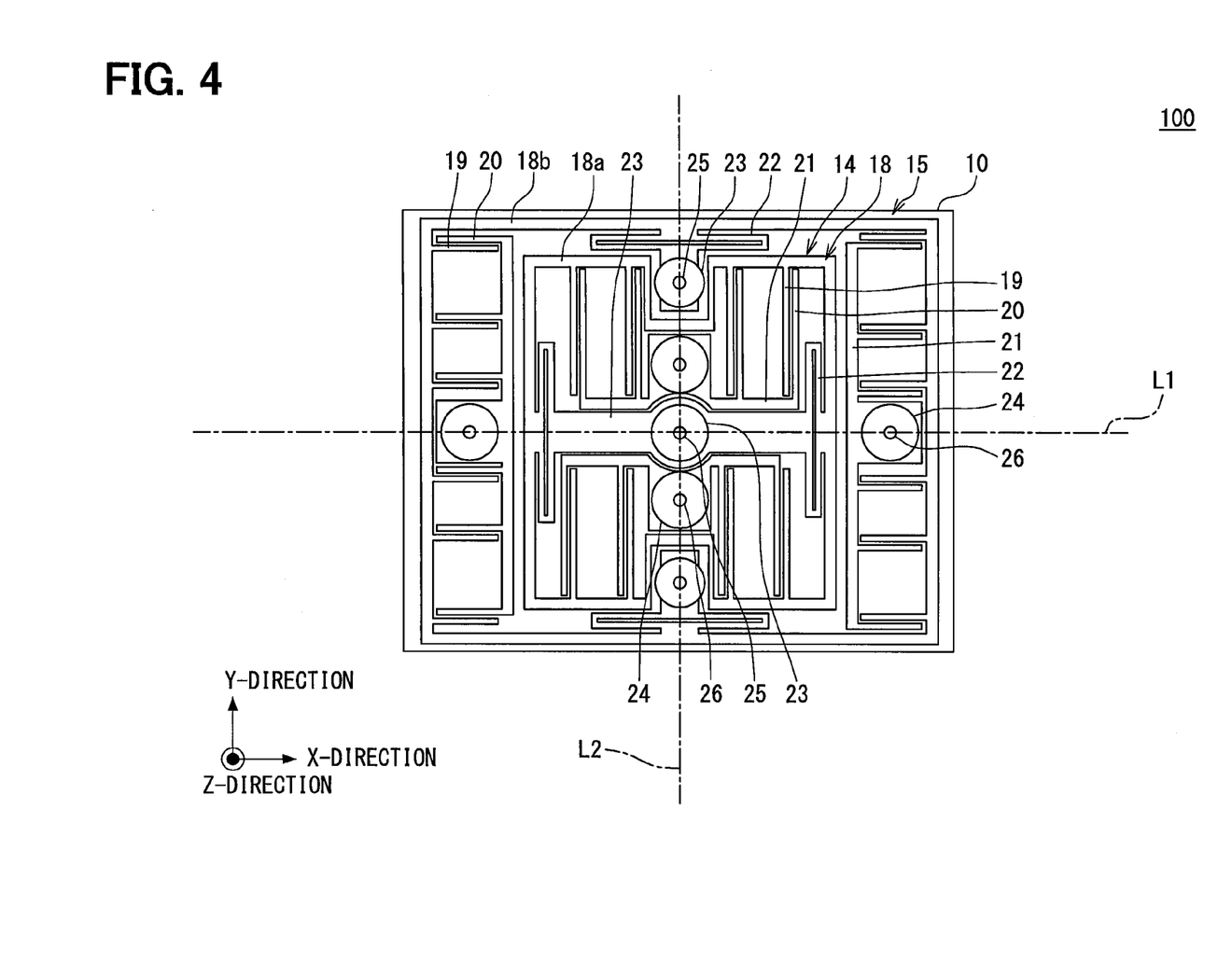
FIG. 4 is a top view illustrating a modification of a sensor device.

In the modification illustrated in FIG. 4, the frame portion 18b of the second sensing portion 15 has the largest dimension in shape among the multiple sensing portions 14, 15 and is arranged along an edge portion on one side 10a of the semiconductor substrate 10. The second sensing portion 15 having the largest dimension in shape is also referred to as an outside sensing portion. With this configuration, the area where the sensing portions 14, 15 are not formed is suppressed from being positioned outside the area surrounded by the frame portion of the sensing portion which has the largest dimension. Thus, a physical size of the sensor device 100 can be reduced compared with a configuration in which the frame portion of the sensing portion which has the largest dimension is not formed along the edge portion on one side of the semiconductor substrate. In the modification illustrated in FIG. 4, the planar dimension of the area surrounded by the frame portion 18b is slightly smaller than the planar dimension of the one side 10a of the semiconductor substrate 10. This configuration further suppresses the formation of an area, where the sensing portions 14, 15 are not formed, at an outside area of the frame portion of the sensing portion which has the largest dimension. Thus, increase in the physical size of the sensor device 100 is further effectively suppressed.

Figure 5:
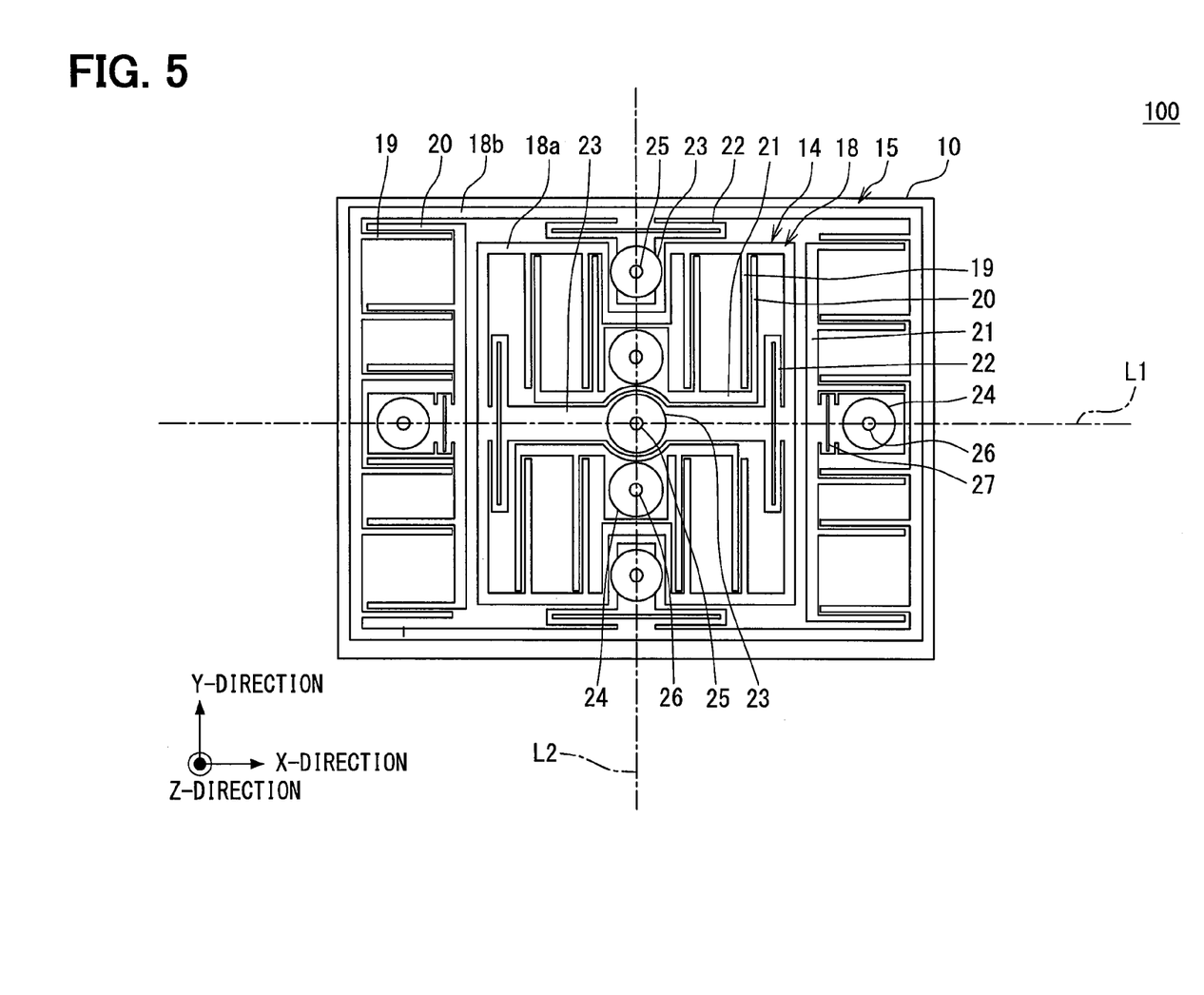
FIG. 5 is a top view illustrating a modification of a sensor device.

In the foregoing embodiment, as illustrated in FIG. 1, the support portions 21 supporting the fixed electrodes 20 are directly coupled to the second anchors 24. As another example, as illustrated in FIG. 5, the support portions 21 may be indirectly coupled to the second anchor 24 through a second beam portion 27 that is springy in the direction perpendicular to the direction in which the movable electrodes 19 and the fixed electrodes 20 are opposed to each other. This configuration suppresses the fixed electrodes 20 from being distorted due to thermal stress caused by thermal distortion in the semiconductor substrate 10. For this reason, degradation in the detection accuracy of the acceleration is suppressed.

Figure 6:
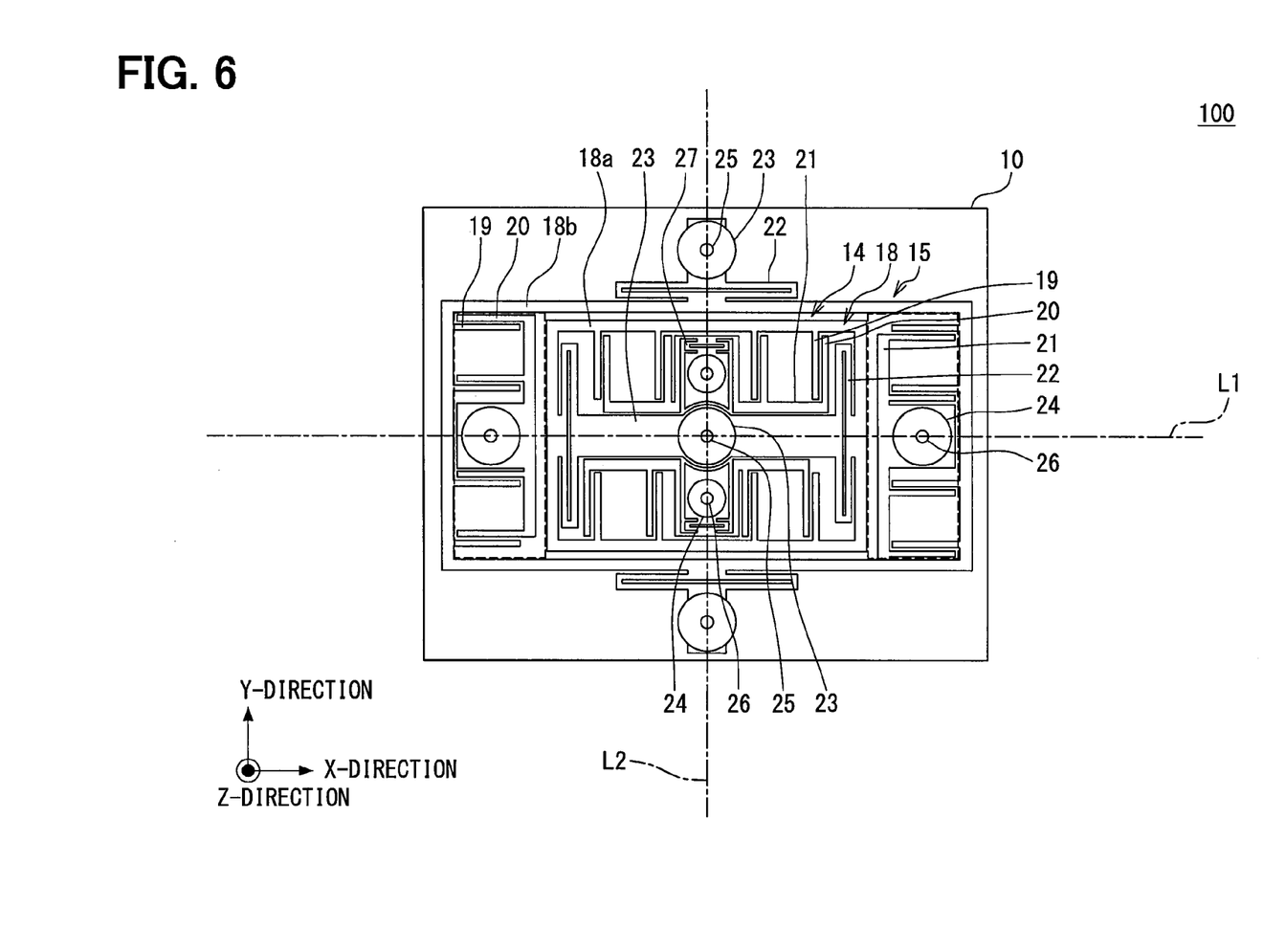
FIG. 6 is a top view illustrating a modification of a sensor device.

In the modification illustrated in FIG. 5, the second beam portion 27 is provided to the second anchor 24 of the second sensing portion 15. As another example, as illustrated in FIG. 6, the second beam portion 27 may be provided to the second anchor 24 of the first sensing portion 14. In the modification illustrated in FIG. 6, the second beam portion 27 is coupled to a surface of the second anchor 24 of the first sensing portion 14. Herein, the surface of the second anchor 24 of the first sensing portion 14 which is coupled to the second beam portion 27 is positioned on an opposite side of a surface of the second anchor 24 of the first sensing portion 14 which is opposed to the first anchor 23. As a result, in the first sensing portion 14, the first anchor 23 is in line with the second anchor 24 and is spaced by the extremely small clearance in the Y-direction. With this configuration, as described in the foregoing embodiment, fluctuation in the area of the facing portion of the two opposed electrodes 19, 20 and the distance between the two opposed electrodes 19, 20 is suppressed compared with a configuration in which the first anchor 23 and the second anchor 24 are away from each other. Herein, the opposed electrodes 19, 20 are suspended by the first anchor 23 and the second anchor 24. Accordingly, degradation in the detection accuracy of the acceleration is suppressed.

Figure 7:
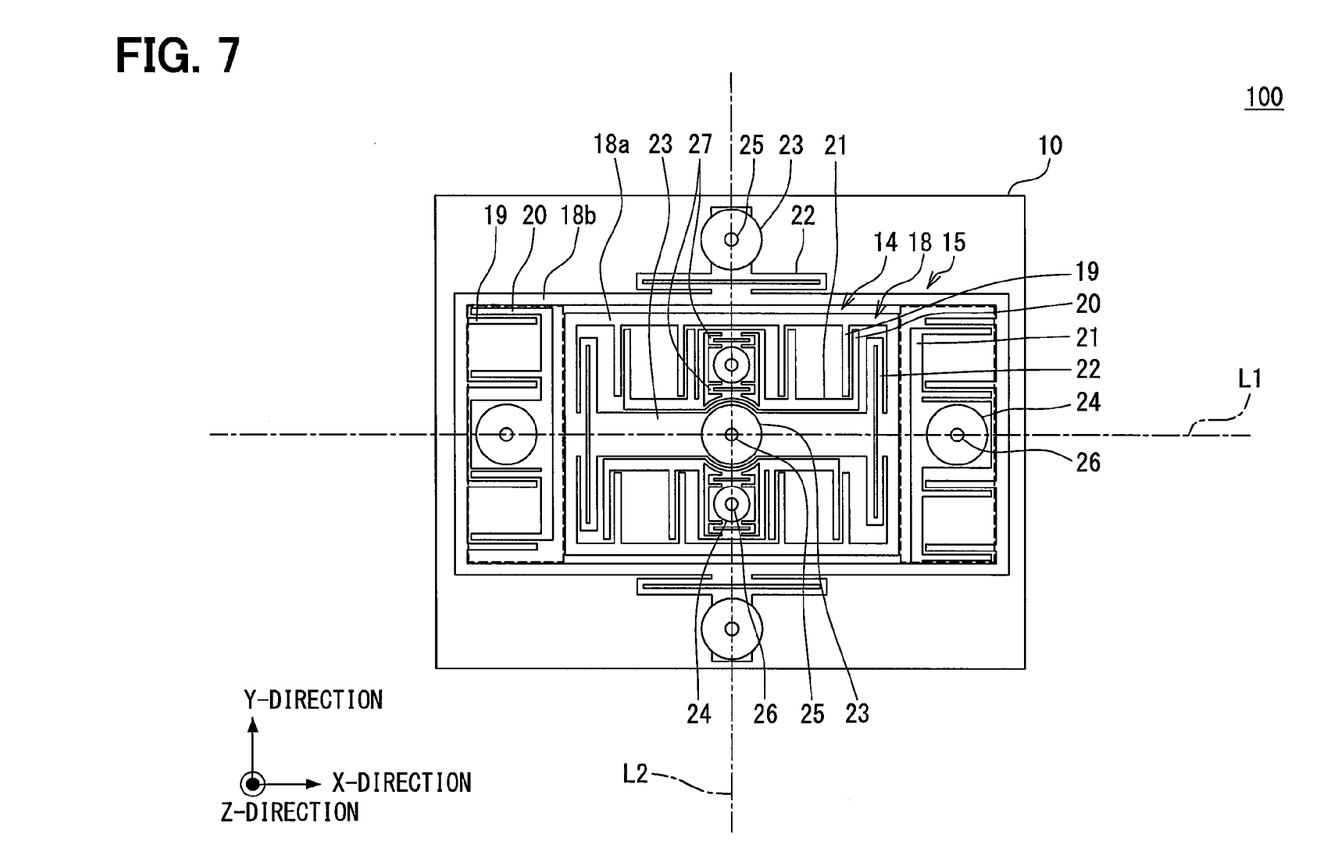
FIG. 7 is a top view illustrating a modification of a sensor device.

In the modifications illustrated in FIG. 5 and FIG. 6, one second beam portion 27 is provided to the second anchor 24. As another example, the number of the second beam portion 27 is not limited to one as the modification described above. As illustrated in FIG. 7, for example, two second beam portions 27 may be provided to the second anchor 24. With respect to the structure in which multiple second beam portions 27 are formed, each of the second beam portions 27 is also referred to as a second sub beam portion. With this configuration, in the semiconductor substrate 10, distortion of the fixed electrodes 20 which is generated by the thermal stress caused by the thermal distortion is more effectively suppressed. Thus, degradation in the detection accuracy of the acceleration is further suppressed.

In the foregoing embodiment, the first sensing portion 14 for detecting the acceleration in the X-direction and the second sensing portion 15 for detecting the acceleration in the Y-direction are formed in the semiconductor substrate 10. As another example, as illustrated in FIG. 8 and FIG. 9, in addition to the sensing portions 14, 15, a third sensing portion 28 for detecting an acceleration in the Z-direction may be formed in the semiconductor substrate 10.

Figure 8:
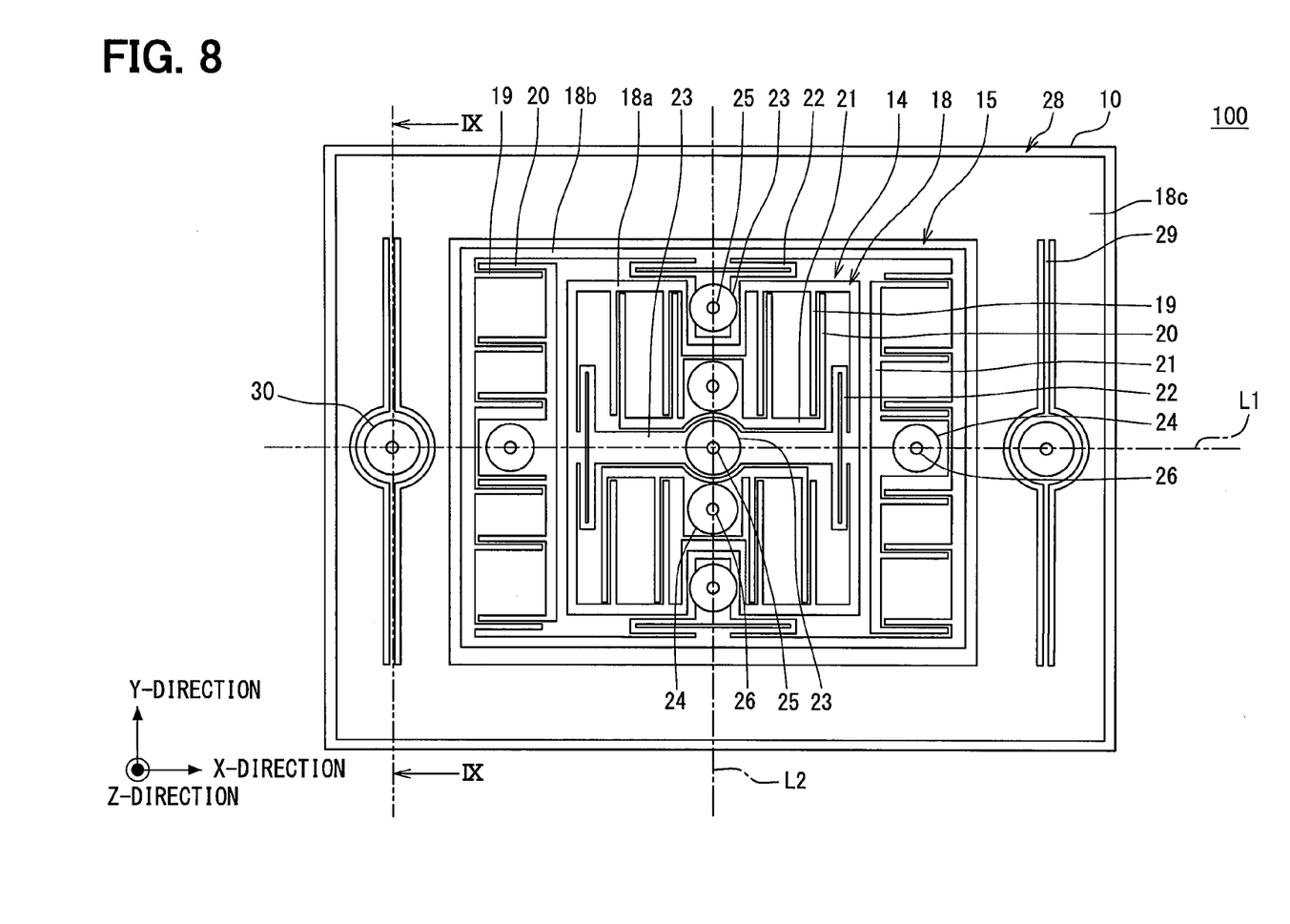
FIG. 8 is a top view illustrating a modification of a sensor device.
Figure 9:
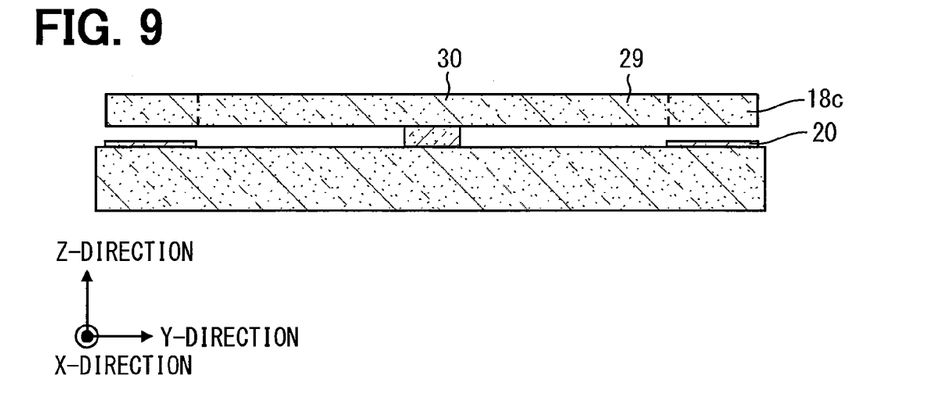
FIG. 9 is a sectional view taken along line IX-IX of FIG. 8.
Figure 10:
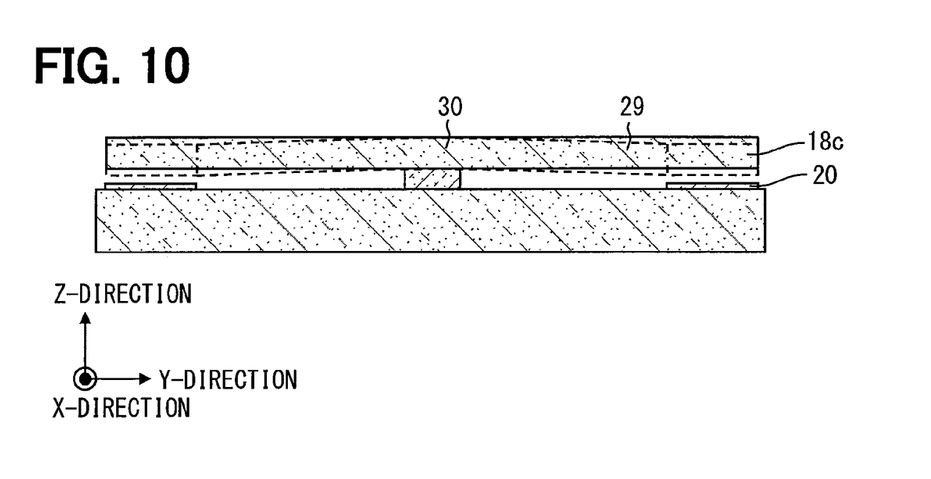
FIG. 10 is a sectional view illustrating a state of displacement when an acceleration is applied.
Figure 11:
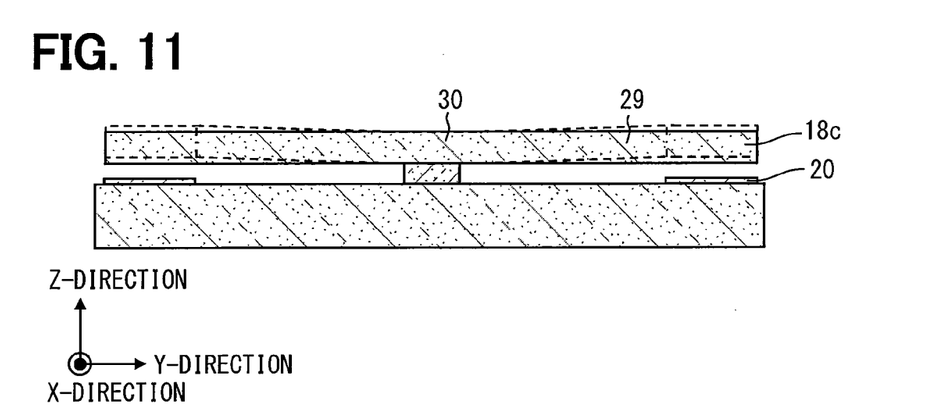
FIG. 11 is a sectional view illustrating a state of displacement when an acceleration is applied.

As shown in FIG. 8 and FIG. 9, the floating portion 16 of the third sensing portion 28 includes a frame portion 18c forming the center of mass and a third beam portion 29 that is springy in the Z-direction. The fixed portion 17 of the third sensing portion 28 includes a third anchor 30 that supports the frame portion 18c above the first semiconductor layer 11 through the third beam portion 29. The frame portion 18c also functions as the movable electrode 19 described in the foregoing embodiment, and the frame portion 18c is opposed, in the Z-direction, to the fixed electrodes 20 formed in the first semiconductor layer 11. With this configuration, when an acceleration is applied upward on the drawing sheet, the frame portion 18c is displaced downward on the drawing sheet as shown by the broken lines in FIG. 10, and the frame portion 18c and the fixed electrodes 20 are displaced so that they become close to each other. When acceleration is conversely applied, that is applied downward on the drawing sheet, the frame portion 18c is displaced upward on the drawing sheet as shown by the broken lines in FIG. 11 and the frame portion 18c and the fixed electrodes 20 are displaced so that they move away from each other. The semiconductor substrate 10 shown in the present modification is formed by joining multiple wafers and each layer 11 to 13 is not a single layer.

Figure 12:
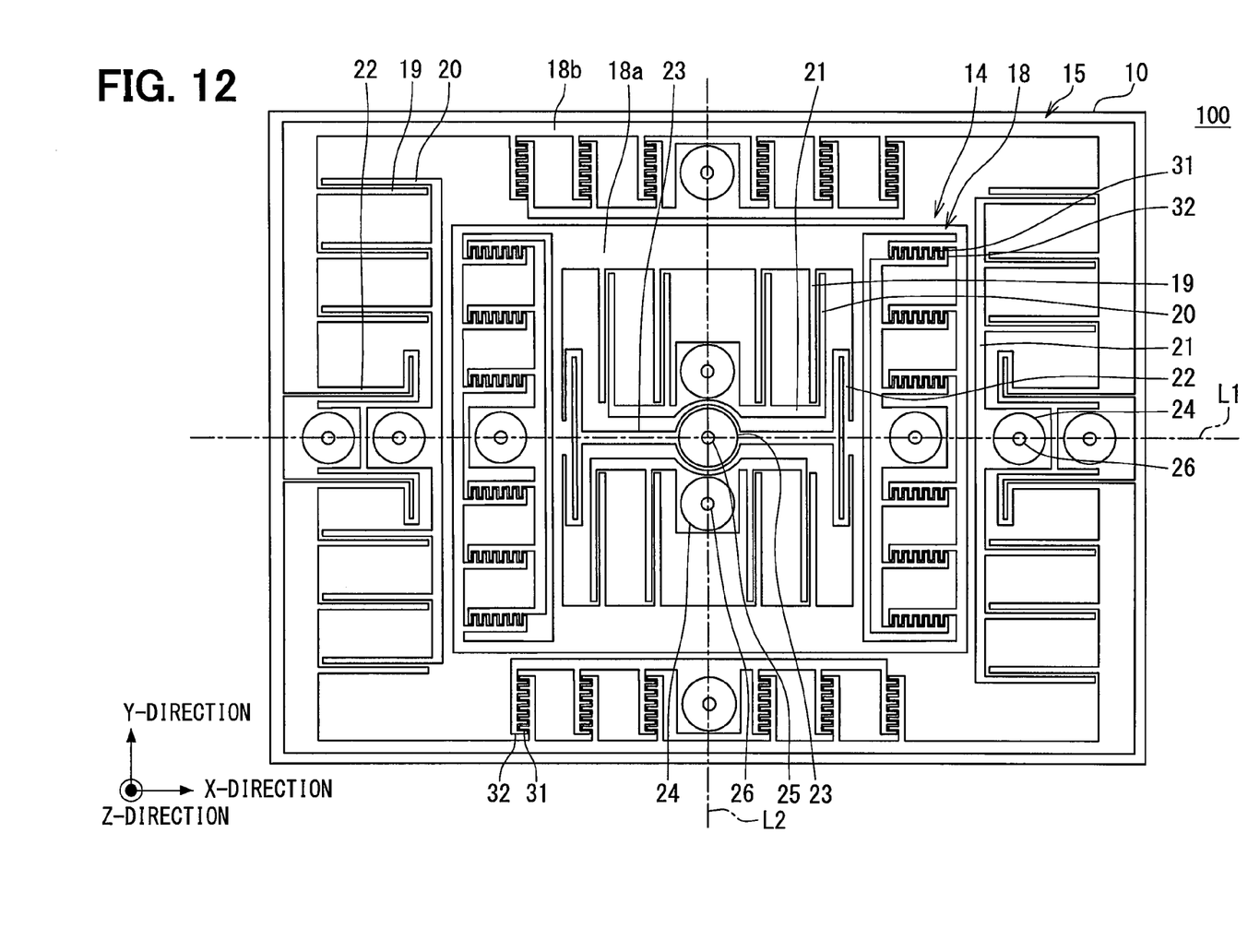
FIG. 12 is a top view illustrating a modification of a sensor device.

In the foregoing embodiment, each of the sensing portions 14, 15 detects the acceleration. As another example, as illustrated in FIG. 12, each of the sensing portions 14, 15 may detect angular velocity. In this case, the floating portion 16 includes a first driving electrode 31 formed in the weight portion 18 and a second driving electrode 32 opposed to the first driving electrode 31 in the direction perpendicular to the direction in which the electrodes 19, 20 are opposed to each other. A predetermined voltage is applied to the weight portion 18 and a voltage whose polarity is periodically inverted is applied to the second driving electrode 32. As a result, the weight portion 18 vibrates in the direction perpendicular to the direction in which the electrodes 19, 20 are opposed to each other. Therefore, when angular velocity is applied in the Z-direction, Coriolis force along the direction in which the electrodes 19, 20 are opposed to each other is produced in the weight portion 18. As a result, the capacitance of each capacitor configured by the electrodes 19, 20 is changed. Consequently, angular velocity can be detected based on the changing capacitance. In this modification, each of the first sensing portion 14 and the second sensing portion 15 detects the angular velocity in the Z-direction and a springy modulus of the first beam portion 22 of first sensing portion 14 is different from a springy modulus of the first beam portion 22 of the second sensing portion 15. Thus, the sensing portions 14, 15 can have different detection ranges.

Though not shown in the drawing, both an acceleration sensor and an angular velocity sensor may be formed in the semiconductor substrate 10.

Figure 13:
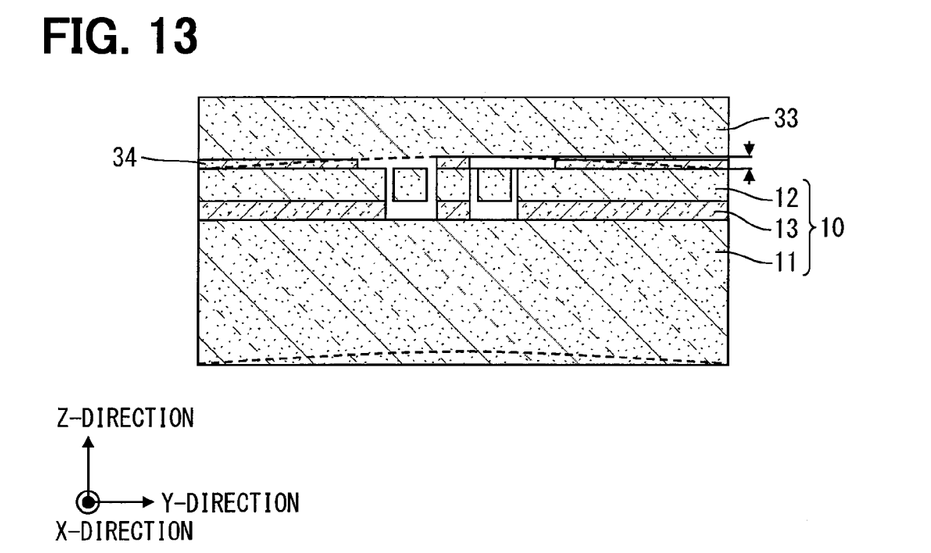
FIG. 13 is a sectional view illustrating a thermal distortion produced in a semiconductor substrate with a lid portion affixed to the semiconductor substrate.
Figure 14:
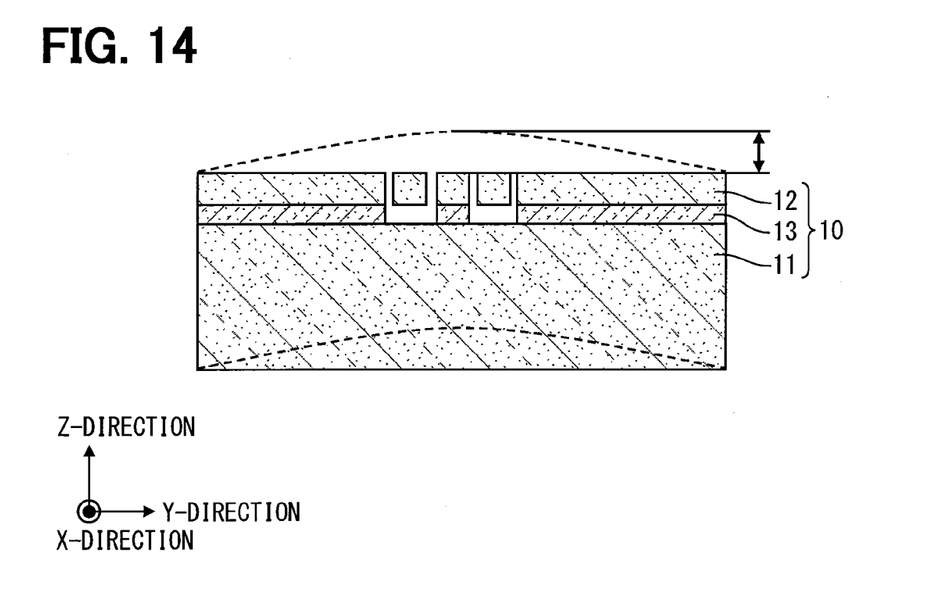
FIG. 14 is a sectional view illustrating a thermal distortion produced in a semiconductor substrate without a lid portion affixed to the semiconductor substrate.

As illustrated in FIG. 13, a lid portion 33 may be provided to the semiconductor substrate 10. Specifically, the lid portion 33 may be configured such that, when the lid portion 3 is affixed to one side 10a of the semiconductor substrate 10, the lid portion 33 defines a housing space for housing the sensing portions 14, 15 between the lid portion 33 and the semiconductor substrate 10. In this configuration, the semiconductor substrate 10 is limited by the lid portion 33. Thus, as shown by the broken lines in FIG. 13 and FIG. 14, a generation of the thermal distortion in the semiconductor substrate 10 affixed with the lid portion 33 is suppressed compared with a configuration in which the lid portion 33 is not affixed to the semiconductor substrate 10. Thus, thermal stress caused by the thermal distortion is suppressed from being applied to each of the sensing portions 14, 15. Dimension indicated by arrows in FIG. 13 and FIG. 14 show distortion amounts of the semiconductor substrates 10 in the Z-direction according to the above modification and the comparison example. The lid portion 33 and the semiconductor substrate 10 may be mechanically coupled to each other by an oxide film 34. In this case, the oxide film 34 may be formed in the second semiconductor layer 12 which configures the fixed portion 17. Though not shown in the drawing, not only the insulating oxide film 34 but also a conductive metal film or glass having a low-melting point may be adopted to fix the lid portion 33 to the semiconductor substrate 10.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A sensor device comprising:
a semiconductor substrate; and
a plurality of sensing portions placed on one side of the semiconductor substrate and converting a physical quantity into an electrical signal, wherein
the one side of the semiconductor substrate is parallel to a reference plane defined by an X-direction and a Y-direction perpendicular to each other,
the semiconductor substrate has a center point that is both a geometric center and a center of mass,
the semiconductor substrate is symmetric with respect to each of a first reference line that passes through the center point and is parallel to the X-direction and a second reference line that passes through the center point and is parallel to the Y-direction, each of the sensing portions is symmetric with respect to each of the first reference line and the second reference line, each of the sensing portions includes a frame portion, the frame portions of the sensing portions have respective sizes different from one another, the sensing portions are arranged in a nested shape such that at least one of the sensing portions is placed inside an area surrounded by the frame portion of another one of the sensing portions, the semiconductor substrate has an other side positioned opposite to the one side, the semiconductor substrate includes a second semiconductor layer, an insulating layer, and a first semiconductor layer arranged in a direction from the one side to the other side of the semiconductor substrate, the insulating layer is sandwiched between the first semiconductor layer and the second semiconductor layer, each of the sensing portions includes a floating portion and a fixed portion, the floating portion of each of the sensing portions is provided by a part of the second semiconductor layer and is floated with respect to the first semiconductor layer without directly contacting the insulating layer, the fixed portion of each of the sensing portions is provided by another part of the second semiconductor layer and is fixed to the first semiconductor layer by the insulating layer, the floating portion of each of the sensing portions includes the frame portion, a movable electrode protruded from a predetermined area of the frame portion, a fixed electrode opposed to the movable electrode, and a first beam portion that is springy in a direction along which the movable electrode and the fixed electrode are opposed to each other, the floating portion of at least one of the sensing portions includes a second beam portion that is springy in a direction perpendicular to the direction in which the movable electrode of the at least one of the sensing portions and the fixed electrode of the at least one of the sensing portions are opposed to each other, the fixed portion of each of the sensing portions includes a first anchor that supports the frame portion and a second anchor that supports the fixed electrode, the first anchor is coupled with the frame portion by the first beam portion in each of the sensing portions, the second anchor is coupled with the fixed electrode by the second beam portion in the at least one of the sensing portions, the first anchor and the second anchor of each of the sensing portions are arranged on at least one of the first reference line or the second reference line, and the first reference line extends perpendicular or parallel to a direction of movement of the movable electrode toward or away from the fixed electrode.

2. The sensor device according to claim 1, wherein the second beam portion includes a plurality of second sub beam portions, and in the at least one of the sensing portions, the second anchor is coupled with the fixed electrode by the second sub beam portions.

3. The sensor device according to claim 1, further comprising:

a lid portion placed on the one side of the semiconductor substrate, the lid portion defining a housing space for housing the sensing portions between the lid portion and the semiconductor substrate.

4. The sensor device according to claim 1, wherein the sensing portions include at least one acceleration sensor.

5. The sensor device according to claim 1, wherein the frame portions of the sensing portions are separated from one another.

6. The sensor device according to claim 1, wherein each of the first anchor and second anchor of the sensing portions that are arranged on the at least one of the first reference line or the second reference line includes a pad configured to receive voltage or output a detection signal.

7. The sensor device according to claim 1, wherein one of the first anchor and the second anchor of the sensing portions is arranged on an intersection of the first reference line and the second reference line on the center point of the semiconductor substrate.

8. The sensor device according to claim 1, wherein one of the first anchor and the second anchor of the inner sensing portion is arranged on an intersection of the first reference line and the second reference line on the center point of the semiconductor substrate.

9. A sensor device comprising:

a semiconductor substrate; and a plurality of sensing portions placed on one side of the semiconductor substrate and converting a physical quantity into an electrical signal, wherein the one side of the semiconductor substrate is parallel to a reference plane defined by an X-direction and a Y-direction perpendicular to each other, the semiconductor substrate has a center point that is both a geometric center and a center of mass, the semiconductor substrate is symmetric with respect to each of a first reference line that passes through the center point and is parallel to the X-direction and a second reference line that passes through the center point and is parallel to the Y-direction, each of the sensing portions is symmetric with respect to each of the first reference line and the second reference line, each of the sensing portions includes a frame portion, the frame portions of the sensing portions have respective sizes different from one another, the sensing portions are arranged in a nested shape such that at least one of the sensing portions is placed inside an area surrounded by the frame portion of another one of the sensing portions, the semiconductor substrate has an other side positioned opposite to the one side, the semiconductor substrate includes a second semiconductor layer, an insulating layer, and a first semiconductor layer arranged in a direction from the one side to the other side of the semiconductor substrate, the insulating layer is sandwiched between the first semiconductor layer and the second semiconductor layer, each of the sensing portions includes a floating portion and a fixed portion, the floating portion of each of the sensing portions is provided by a part of the second semiconductor layer and is floated with respect to the first semiconductor layer without directly contacting the insulating layer, the fixed portion of each of the sensing portions is provided by another part of the second semiconductor layer and is fixed to the first semiconductor layer by the insulating layer, the floating portion of each of the sensing portions includes the frame portion, a movable electrode protruded from a predetermined area of the frame portion, a fixed electrode opposed to the movable electrode, and a first beam portion that is springy in a direction along which the movable electrode and the fixed electrode are opposed to each other, the floating portion of at least one of the sensing portions includes a second beam portion that is springy in a direction perpendicular to the direction in which the movable electrode of the at least one of the sensing portions and the fixed electrode of the at least one of the sensing portions are opposed to each other, the fixed portion of each of the sensing portions includes a first anchor that supports the frame portion and a second anchor that supports the fixed electrode, the first anchor is coupled with the frame portion by the first beam portion in each of the sensing portions, and the second anchor is coupled with the fixed electrode by the second beam portion in the at least one of the sensing portions, one of the sensing portions is an inside sensing portion that is the smallest among the sensing portions, the first anchor and the second anchor of the inside sensing portion are arranged on at least one of the first reference line or the second reference line, and the first anchor is spaced from the second anchor via a clearance, in the inside sensing portion, the second anchor has two opposite surfaces including one surface and an other surface opposed to the first anchor, and the second beam portion is coupled with the one surface of the second anchor, and the first reference line extends perpendicular or parallel to a direction of movement of the movable electrode toward or away from the fixed electrode.

10. The sensor device according to claim 9, wherein the frame portions of the sensing portions are separated from one another.

11. The sensor device according to claim 9, wherein each of the first anchor and second anchor of the sensing portions that are arranged on the at least one of the first reference line or the second reference line includes a pad configured to receive voltage or output a detection signal.

* * * * *